Jan. 13, 1959   G. W. PRATT   2,868,533
METHOD OF MINIMIZING HEAT INDUCED STRESS IN
GLASS-WALLED ARTICLES PROVIDED
WITH METAL INSERTS
Filed Dec. 12, 1955
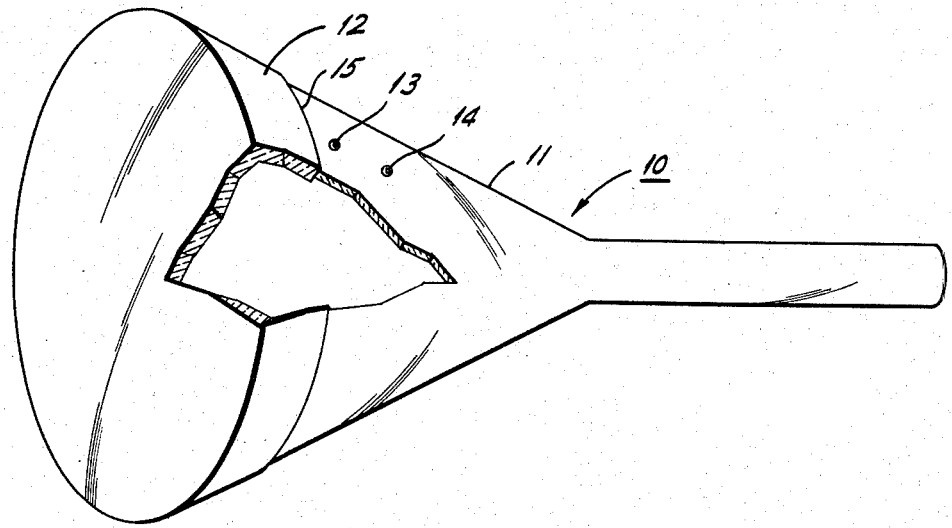
INVENTOR.
GEORGE W. PRATT
BY
ATTORNEY

2,868,533

METHOD OF MINIMIZING HEAT INDUCED STRESS IN GLASS-WALLED ARTICLES PROVIDED WITH METAL INSERTS

George W. Pratt, Gwynedd Valley, Pa., assignor to Philco Corporation, Philadelphia, Pa., a corporation of Pennsylvania Application December 12, 1955, Serial No. 552,418

5 Claims. (Cl. 263—2)

This invention is directed to the prevention of breakage of glass-walled articles which are provided with metal inserts and which must be subjected to considerable heat as an incident to completion for their intended use. The invention is particularly directed to the prevention of breakage of glass envelopes of cathode ray tubes which are provided with metal contact buttons and which must be subjected to so-called "bakeout" heating. Therefore, the invention will be described with particular reference to this specific application.

Present day cathode ray tubes, such as those used in television instruments, employ metal contact buttons to enable the making of electrical connections through the wall of the glass envelope. In the manufacture of such tubes, it is necessary to heat the glass envelope sufficiently to drive out impurities in gaseous form from the coatings provided on the interior surfaces. This is commonly known as "bakeout" heating.

In the past this bakeout heating has been responsible for considerable breakage of the glass envelopes, which at times has run as high as 20%. This has been due to a high degree of heat expansion of the metal contact buttons relative to the glass, which creates stress in the proximate glass areas and thus tends to cause breakage of the glass.

Although metal alloys were used having a coefficient of expansion substantially matching the coefficient of expansion of the glass, this did not solve the problem and did not appreciably reduce the wasteful breakage.

The principal object of this invention is to provide a solution of this problem, and to prevent or minimize the breakage heretofore caused by the heating of such articles.

In seeking a solution of this problem, it was found that the principal cause of the breakage was the heat absorption property of the metal buttons. Being rather dark and of low thermal capacity, these buttons would heat much more rapidly than the surrounding glass, and their relatively greater heat expansion would create a stress in the proximate glass areas. Following this discovery, I conceived the possibility that minimization of the heat-induced stress could be effected by the utilization of a coating or coatings to alter the relative rates of heat absorption of the metal buttons and the proximate glass areas, and thereby decrease the differential expansion. Subsequent experimentation showed that this was possible, and it proved to be the solution of the problem.

According to the preferred embodiment of this invention, the desired result is achieved by coating the metal buttons with a heat-reflecting material so as to reduce the rate of heat absorption of the buttons, and thereby decrease the differential expansion between them and the proximate glass areas. However, a possible alternative procedure is to coat the vulnerable glass areas with a heat-absorbing material to increase their heat expansion, and thus decrease the differential expansion between the metal buttons and the proximate glass areas. Furthermore, in extreme cases, both types of coatings may be employed.

Reference is now made to the accompanying drawing wherein the single figure is a perspective view of a cathode ray tube envelope with a portion broken away for the purpose of illustration.

The cathode ray tube envelope illustrated in the drawing is of a type in which the breakage problem was particularly severe prior to this invention. In this type of cathode ray tube envelope, the screen end portion of the tube is thicker than the rest of the tube envelope and is formed as an independent element which is sealed to the thinner walled portion of the envelope. Usually, a single metal contact button is employed, and if it is located near the junction of the two portions of the envelope, the breakage tendency is all the more pronounced because of the different thicknesses of the two portions which are particularly vulnerable to stresses in the immediate vicinity of the juncture of the two portions.

Referring more particularly to the drawing, there is shown a cathode ray tube envelope designated generally by reference numeral 10, which comprises the portions 11 and 12 above-mentioned formed of glass and having different thicknesses as shown. Normally, a single metal contact button is provided on the conical wall of the portion 11, the button extending through the wall and serving to enable the making of electrical connection through the wall, as is well understood by those skilled in the art. In the illustration, two metal buttons 13 and 14 are shown, the only purpose of this being to show different locations of the metal button in relation to the juncture between portions 11 and 12. With the metal contact button located as represented at 13, there is even more of a tendency toward breakage of the glass envelope during the bakeout heating than there is with the metal button located further from the juncture 15, as represented at 14.

In the manufacture of a cathode ray tube, after construction of the glass envelope with the metal contact button provided thereon, it is necessary to subject the envelope to bakeout heating in order to drive out impurities in gaseous form from the coatings, such as the screen coating, provided on the internal surfaces of the envelope. This bakeout heating is usually performed in a radiant heating oven. Prior to this invention, it was the cause of serious and wasteful breakage during manufacture of cathode ray tubes.

As previously mentioned, it was found the principal cause of the breakage was the relatively great heat absorption and expansion of the metal contact button in comparison to that of the glass. Since the metal button is relatively small, it has low thermal capacity, and being rather dark it would absorb sufficient heat to cause it to heat much more rapidly than the surrounding glass. The consequent differential expansion of the metal button and the glass would create the stress in the glass that frequently caused breakage.

In accordance with the preferred embodiment of the present invention, this heat-induced stress is minimized by coating the metal contact button with a heat-reflecting material so as to reduce the rate of heat absorption by the button, and thereby decrease the differential expansion between the metal button and the proximate glass areas. Any suitable coating may be employed. For example, a white silver paste, i. e., a suspension of powdered silver in an organic binder, or a slurry of magnesium oxide, may be employed and may be applied simply by brushing. Each of these materials has been employed in practice and has been found to be entirely satisfactory. Actual use of the invention in the manufacture of cathode ray tubes has resulted practically in the elimination of breakage due to bakeout heating.

Since the purpose of the invention is to reduce the differential expansion of the metal button and glass during heating, an alternative method according to this invention is to coat the glass with a heat-absorbing material so as to effect increase of the heat expansion of the glass and thus decrease the differential expansion. Suitable material for this purpose is a suspension of powdered graphite in sodium or potassium silicate and water.

Since both types of coatings are directed to the same end, in extreme cases both coatings may be employed.

While the invention has been described herein with reference to certain specific embodiments, it will be understood that the invention is not limited thereto but contemplates such modifications and further embodiments as may occur to those skilled in the art.

I claim:

1. In the manufacture of a cathode ray tube whose envelope must be subjected to bakeout heating to drive out impurities, the method which comprises: providing a glass envelope having at least one metal button extending transversely through the wall of the glass envelope, said button being a dark body of low thermal capacity which normally would heat much more rapidly than the surrounding glass when subjected to bakeout heating, coating surfaces on the composite envelope to reduce the differential heat absorption and the consequent differential expansion of the metal button and the proximate glass wall during bakeout heating, and subjecting the composite envelope to bakeout heating during which the applied coating is effective to minimize stress in the glass wall proximate to said button.

2. In the manufacture of cathode ray tubes whose envelope must be subjected to bakeout heating to drive out impurities, the method which comprises: providing a glass envelope having at least one metal button extending transversely through the wall of the glass envelope, said button being a dark body of low thermal capacity which normally would heat much more rapidly than the surrounding glass when subjected to bakeout heating, coating said button with a heat-reflecting material to reduce its heat absorption and thereby reduce the differential expansion of the metal button and the proximate glass wall during bakeout heating, and subjecting the composite envelope to bakeout heating during which the applied coating is effective to minimize stress in the glass wall proximate to said button.

3. In the manufacture of cathode ray tubes whose envelope must be subjected to bakeout heating to drive out impurities, the method which comprises: providing a glass envelope having at least one metal button extending transversely through the wall of the glass envelope, said button being a dark body of low thermal capacity which normally would heat much more rapidly than the surrounding glass when subjected to bakeout heating, coating said button with a white silver paste to reduce its heat absorption and thereby reduce the differential expansion of the metal button and the proximate glass wall during bakeout heating and subjecting the composite envelope to bakeout heating during which the applied coating is effective to minimize stress in the glass wall proximate to said button.

4. In the manufacture of cathode ray tubes whose envelope must be subjected to bakeout heating to drive out impurities, the method which comprises: providing a glass envelope having at least one metal button extending transversely through the wall of the glass envelope, said button being a dark body of low thermal capacity which normally would heat much more rapidly than the surrounding glass when subjected to bakeout heating, coating said button with magnesium oxide to reduce its heat absorption and thereby reduce the differential expansion of the metal button and the proximate glass wall during bakeout heating, and subjecting the composite envelope to bakeout heating during which the applied coating is effective to minimize stress in the glass wall proximate to said button.

5. In the manufacture of cathode ray tubes whose envelope must be subjected to bakeout heating to drive out impurities, the method which comprises: providing a glass envelope having at least one metal button extending transversely through the wall of the glass envelope, said button being a dark body of low thermal capacity which normally would heat much more rapidly than the surrounding glass when subjected to bakeout heating, coating the glass surface proximate to said button with a heat-absorbing material to reduce the differential heat absorption and the consequent differential expansion of the metal button and the proximate glass wall during bakeout heating, and subjecting the composite envelope to bakeout heating during which the applied coating is effective to minimize stress in the glass wall proximate to said button.

References Cited in the file of this patent

UNITED STATES PATENTS

| | | |
|---|---|---|
| 1,565,598 | Sprosser | Dec. 15, 1925 |
| 2,200,911 | Bowie | May 14, 1940 |
| 2,452,488 | Paddock et al. | Oct. 26, 1948 |
| 2,694,168 | North et al. | Nov. 9, 1954 |